United States Patent [19]
Lacore et al.

[11] Patent Number: 5,546,639
[45] Date of Patent: Aug. 20, 1996

[54] SHOCK CORD HOOKS

[75] Inventors: Ernest H. Lacore, Cromwell, Conn.; Thomas S. Weaver, Essex Junction, Vt.

[73] Assignee: Wecor, Cromwell, Conn.

[21] Appl. No.: 411,336

[22] Filed: Mar. 27, 1995

[51] Int. Cl.[6] .............................. A44B 13/00; F16B 2/10; F16G 11/00
[52] U.S. Cl. .................. 24/265 H; 24/136 R; 24/136 L; 24/905; 24/300; 24/129 R; 403/315
[58] Field of Search .......................... 24/265 H, 265 EE, 24/115 L, 136 L, 136 R, 128, 116 A, 598.5, 905, 715.5, 715.6; 403/315

[56] References Cited

U.S. PATENT DOCUMENTS

| | | | |
|---|---|---|---|
| 123,340 | 2/1872 | Fiester. | |
| 252,832 | 1/1882 | Bernd. | |
| 1,686,424 | 10/1928 | Thomson et al. | 24/598.5 X |
| 1,804,377 | 5/1931 | Freysinger | 24/905 X |
| 3,019,504 | 2/1962 | Castagliuolo | 24/265 EE |
| 3,332,163 | 7/1967 | Stewart et al. | 24/116 A X |
| 3,584,606 | 6/1971 | Reidhead | 24/128 X |
| 3,636,594 | 1/1972 | Faivre | 24/713.1 X |
| 3,751,772 | 8/1973 | Grandjanny | 24/136 R X |
| 3,857,645 | 12/1974 | Klein | 24/129 R |
| 3,898,760 | 8/1975 | Klein | 24/128 X |
| 4,368,999 | 1/1983 | Morel | 24/537 X |
| 4,432,121 | 2/1984 | Dupre | 24/115 H |
| 4,577,374 | 3/1986 | Lii | 24/265 H X |
| 4,622,724 | 11/1986 | Dupre | 24/115 H X |
| 4,918,785 | 4/1990 | Spinner et al. | 24/136 L X |
| 5,003,672 | 4/1991 | Randall | 24/136 L X |
| 5,136,756 | 8/1992 | Krauss | 24/265 H |
| 5,317,788 | 6/1994 | Esposito et al. | 24/300 |
| 5,383,259 | 1/1995 | McIntire | 24/265 H X |

Primary Examiner—Peter M. Cuomo
Assistant Examiner—Robert J. Sandy
Attorney, Agent, or Firm—Randy W. Lacasse

[57] ABSTRACT

A mechanism for fastening a hook to a shock cord. The mechanism uses a cap to enclose and capture an end of the shock cord inside a cavity of the fastening mechanism. The fastening mechanism includes an aperture and side openings which each expose its inner cavity. A shock cord is fed through the aperture and at least one side opening, enlarged by doubling over and crimping and secured therein by an endcap. Alternatively, the slot and aperture are joined, which allows the shock cord to be easily pressed into the cavity.

18 Claims, 1 Drawing Sheet

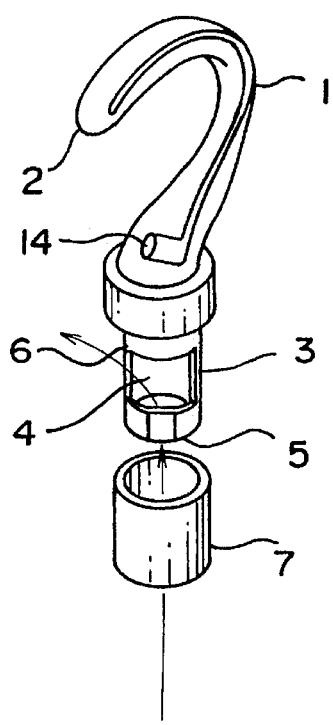
FIG. 1
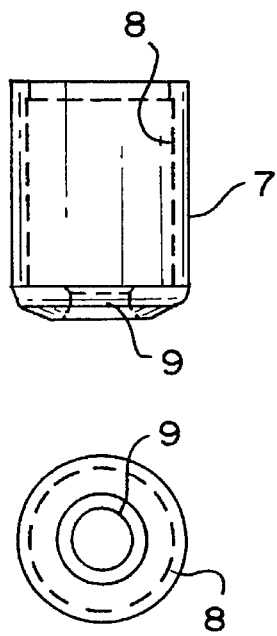
FIG. 2a
FIG. 2b
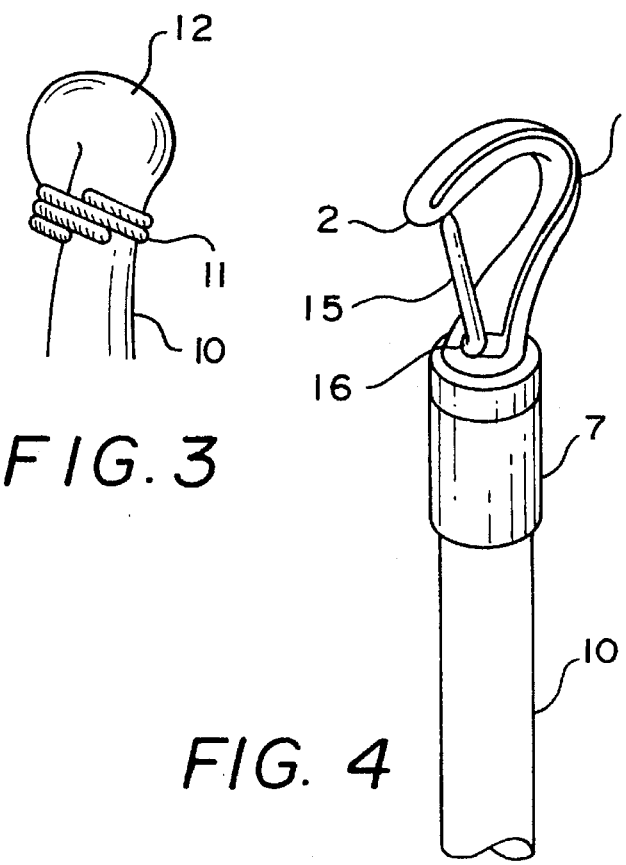
FIG. 3
FIG. 4
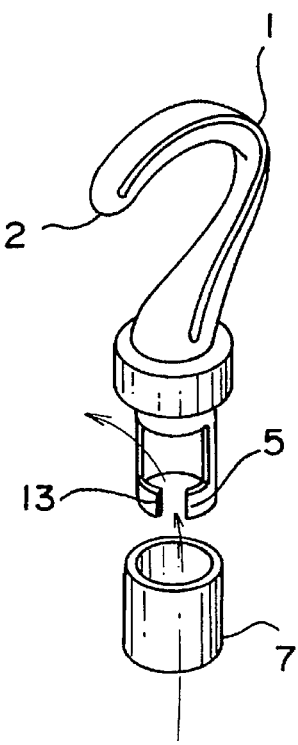
FIG. 5

SHOCK CORD HOOKS

BACKGROUND OF THE INVENTION

1. Field of Invention

The present invention is generally directed to a method of fastening attachments to cord type objects and more particularly to a method for the attachment of hooks to shock cords.

The use of shock cords, elastic type ropes, cables or bungee cords is well known. They are commonly used to secure items such as luggage to automobiles, motorcycles, etc.

Shock cords generally require hooks of some type at each end to aid in their use. It is common to find "bungee cords" with metal hooks fastened at each of the cords' ends. Securing hooks to a cord generally involves inserting the cord through a central aperture in the hooks base, and then doubling over and/or crimping a ring around the cord to prevent it from slipping back through the aperture.

2. Discussion of Prior Art

U.S. Pat. No. 5,317,788 provides for a method which includes the steps of threading an elastic cord through a tapered channel, doubling over the end of the cord and crimping it with a metal band. The diameter of the metal band is larger than the small end of the tapered channel, thus preventing the cord from slipping back through.

U.S. Pat. No. 5,136,756 provides for a hinged fastening means with an aperture to insert a cord, whereby the fastener is folded over to clasp the cord between protruding teeth.

U.S. Pat. No. 4,622,724 provides for a security clamp for cables, wherein bridgelets on either side of an inlet and contoured imprints facilitate the engagement of the cable.

The prior art lacks an easy and effective method of attaching objects to the ends of flexible cords.

SUMMARY OF THE INVENTION

It is an object of the present invention to provide a method of attaching hooks or other attachments to stretch cords, and a mechanism for implementing the method.

It is a further object of this invention to provide a means to capture, cover and secure a hook or other attachment to a shock cord.

It is a further object of this invention to provide a means to make a stronger and more secure attachment bond.

These objects and others are accomplished by using a fastening mechanism which includes a base and cord receiving aperture which give easy access to an internal cavity for capturing a folded and crimped cord end. The fastening mechanism also includes a covering cap to enclose and secure the folded and crimped cord end in the cavity.

BRIEF DESCRIPTION OF THE DRAWINGS

FIG. 1 illustrates an exploded view of a hook with a hook base and securing endcap.

FIGS. 2a and 2b illustrate a bottom and internal view of the endcap.

FIG. 3 illustrates a doubled over and crimped end of a shock cord.

FIG. 4 illustrates the assembled crimped cord with cap secured.

FIG. 5 illustrates a secondary embodiment of the hook with a slotted base.

DESCRIPTION OF THE PREFERRED EMBODIMENTS

As shown in FIG. 1, a shock cord hook 1 of the present invention is comprised of a generally hook shaped portion 2 and a generally cylindrically shaped base portion 3. The base portion 3 is comprised of a hollow cylinder with an inner cavity 4 and at least one side opening 6. An aperture 5 is centered through the bottom of the base portion 3, wherein the diameter of the aperture 5 is less than the diameter of the cavity 4. The aperture is closed around its entire circumference.

FIGS. 2a and 2b show a detailed drawing of the endcap 7 as shown in FIG. 1. The endcap is generally cylindrically shaped with an inner cavity 8 which opens at one end. An aperture 9 is centered in a bottom end and is of a lesser diameter than the inner cavity 8. The upper inner surface of 8 end includes a lipped retainer section (not shown) for fictionally engaging the base 3 when fully assembled. The inner diameter of cavity 8 of cap 7 should be slightly greater than the outer diameter of base portion 3, so that they fit snugly when engaged. Other methods to improve the fit, and/or locking properties such as tapering the diameter of the cap 7 and/or base portion 3 are known in the art.

FIG. 3 shows an end of a shock cord 10. The cord 10 has been doubled over and a crimping ring 11 has been attached to secure the cord in this position effectively enlarging the diameter of the cord end. The enlarged diameter of doubled over cord 12 is purposely made greater than the diameter of aperture 5 in the endcap 7 such that once assembled it cannot be removed by pulling it therethrough. The crimping ring 11 may be made of another material other than metal.

To secure the cord 10 to the hook the following steps are followed:

1. Feed one end of cord 10 through the bottom opening 9 of the endcap 7. The diameter of hole 9 should be such that cap 7 slides easily along cord 10, but not larger than the diameter of crimping ring 11 or the doubled over cord end 12;

2. Feed the same end through aperture 5 and out through opening 6;

3. Modify end of cord 10 to enlarged diameter. The preferred method being to double over the end and secure with metal crimping ring 11, as shown in FIG. 3;

4. Pull cord 10 downward through opening 6 until doubled over end 12 of cord 10 is seated within cavity 4, and 5. Slide endcap 7 upwardly onto base 3 until it snap locks.

6. The method may be repeated at the other end of the cord 10.

In the preferred embodiment, the hook 1 is a molded plastic member comprising both the hook portion 2 and the base potion 3. However other known manufacturing methods and materials may be used. Additionally, the hook 2 and base portion 3 may be manufactured separately and subsequently connected. The hook portion 2 may encompass other known shapes or forms of attachment devices such as a safety hook as disclosed in U.S. Pat. No. 4,622,724.

In a secondary embodiment, FIG. 5 shows the bottom portion of base 3 having a slot 13 cut-out lengthwise along the periphery of the base portion 3, thus exposing the cavity 4 and aperture 5.

In attaching the cord to the connector, the cord 10 is folded over and crimped as with the above method (FIG. 3). Next, the folded and crimped section is pressed into cavity 4 of base portion 3 via cut-out slot 13 and opening 6, so that the doubled over and crimped portion of cord 10 lies inside of cavity 4 and cord 10 protrudes through hole 5. Finally, cap 7 is slid up onto base portion 3 until it locks, effectively covering the exposure to inner cavity 4 and securing shock cord 10 to hook 1.

In a third embodiment, the diameter of aperture 9 is greater than the diameter of crimping ring 11 and the doubled over cord end 12. In this case, the cord 10 may be inserted through aperture 9 of cap 7 before or after the end of cord 10 is enlarged.

In a fourth embodiment, the hook 1 may be prefabricated with a receiving aperture 14. This aperture allows for the selective insertion of a safety hasp 15 which may be inserted during manufacture or at a later time to vary the effective use of the hook. In practice, the hasp has a ball 16 located at the connecting end. The relative size of the aperture and hasp ball requires that the ball to be forcibly pressed into the aperture. The ball is then retained by compressive forces within the aperture.

CONCLUSION

An apparatus and method has been shown in the above embodiments for effectively fastening attachments to cord type objects including hooks to shock cords. While various preferred embodiments have been shown and described, it will be understood that there is no intent to limit the invention by such disclosure, but rather, is intended to cover all modifications and alternate constructions falling within the spirit and scope of the invention as defined in the appended claims.

In particular, the invention should not be limited to hooks only attached to shock cords. The invention could be implemented for various types of end attachments and be attached to other types of corded members.

We claim:

1. A fastening mechanism for attaching a hook to an end of a cord, comprising:
    a cord;
    a hook with an integral base member having at least a top and a bottom, said hook located at the top of said base member, and wherein said base member comprises:
    an internal storage section,
    at least one slot exposing said storage section, and
    an aperture in said bottom of said base member;
        said aperture having a diameter less than a diameter of said internal storage section;
    a cap having an upper opening to engage and substantially cover said base member and a lower opening to receive said end of said cord, and
    wherein said end of said cord is secured within said storage section during assembly and said cap is slidingly engaged onto said base member to retain the end of said cord therein.

2. The fastening mechanism of claim 1, wherein a portion of said end of said cord is doubled over and crimped to increase its effective diameter and this doubled over and crimped portion is retained within said internal storage section.

3. The fastening mechanism of claim 1, wherein said base member has a slot which receives said end of said cord.

4. The fastening mechanism of claim 2, wherein said base member has a slot which receives said doubled over and crimped end of said cord.

5. The fastening mechanism of claim 1, wherein said base member and said cap are substantially cylindrical.

6. The fastening mechanism of claim 1, wherein said hook and base member are made of plastic.

7. The fastening mechanism of claim 1, wherein said cord has elastic properties.

8. The fastening mechanism of claim 2, wherein said cap has an inner diameter larger than the folded and crimped portion of said cord to allow said cord to be received therein selectively before or after said diameter of said cord is enlarged.

9. The fastening mechanism of claim 1, wherein said hook further comprises an aperture for frictional receiving and retaining a safety hasp.

10. A method of securing a fastening element to an end of a cord, comprising substantially the steps of:
    inserting a cord through a hole in a securing cap;
    inserting said cord through a receiving opening of said fastening element;
    folding a portion of said end of said cord and crimping said folded portion of said end of said cord;
    pressing said folded and crimped portion of said cord into a storage section of said fastening element, and
    sliding said securing cap onto said fastening element to secure said cord within said fastening element.

11. The method of claim 10, wherein said securing cap has an inner diameter larger than the folded and crimped portion of said cord to allow said cord to be received therein selectively before or after said diameter of said cord is enlarged.

12. The method of claim 10, wherein said receiving opening has a slotted opening for receiving said cord.

13. The method of claim 11, wherein said fastening element is a hook.

14. The method of claim 13, wherein said storage section is integral with said hook and is substantially cylindrical.

15. The method of claim 13, wherein said hook is plastic.

16. The method of claim 11, wherein said cord has elastic properties.

17. The method of claim 13, wherein said hook further comprises an aperture for frictional receiving and retaining a safety hasp.

18. A fastening mechanism for attaching a fastening element to an end of a cord, comprising:
    a cord;
    a fastening element with an integral base member having at least a top and a bottom, said fastening element located at the top of said base member, and wherein said base member comprises:
    an internal storage section,
    at least one slot exposing said storage section, and
    an aperture in said bottom of said base member;
        said aperture having a diameter less than a diameter of said internal storage section;
    a cap having an upper opening to engage and substantially cover said base member and a lower opening to receive said end of said cord, and
    wherein said end of said cord is secured within said storage section during assembly and said cap is slidingly engaged onto said base member to retain the end of said cord therein.

* * * * *